United States Patent
Hara et al.

(10) Patent No.: US 7,843,164 B2
(45) Date of Patent: Nov. 30, 2010

(54) POWER SUPPLY SYSTEM, POWER SUPPLY PLATE AND ELECTRONIC EQUIPMENT

(75) Inventors: Mieko Hara, Tokyo (JP); Yoichi Miyajima, Tokyo (JP); Hiroaki Sato, Kanagawa (JP); Yoshihito Tamesue, Aichi (JP); Mitsuo Yamaguchi, Aichi (JP); Shoichi Shintani, Saitama (JP); Shinji Suzuki, Aichi (JP); Masashi Kumada, Aichi (JP); Ryoichi Nakashima, Tokyo (JP); Jiro Moriya, Chiba (JP); Hisashi Aoki, Aichi (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 11/940,889

(22) Filed: Nov. 15, 2007

(65) Prior Publication Data

US 2008/0136262 A1 Jun. 12, 2008

(30) Foreign Application Priority Data

Dec. 6, 2006 (JP) .......................... P2006-329758

(51) Int. Cl.
*H02J 7/00* (2006.01)
(52) U.S. Cl. .......................... 320/106; 320/103; 307/86
(58) Field of Classification Search ................. 307/103, 307/106
See application file for complete search history.

(56) References Cited

U.S. PATENT DOCUMENTS 5,420,496 A * 5/1995 Ishikawa .................... 320/106

2004/0150944 A1 * 8/2004 Byrne et al. ................. 361/683
2004/0239291 A1 * 12/2004 Watanabe .................... 320/106
2006/0188249 A1    8/2006 Noguchi
2006/0250110 A1 * 11/2006 Yanagida et al. ............. 320/114
2007/0164703 A1 *  7/2007 Noguchi et al. ............. 320/107

FOREIGN PATENT DOCUMENTS

| JP | 02-176920 | 7/1990 |
| JP | 03-089811 | 4/1991 |
| JP | 05-204485 | 8/1993 |
| JP | 11-275768 | 10/1999 |
| JP | 2004-023682 | 1/2004 |
| JP | 2005-251834 | 9/2005 |
| JP | 2006-048131 | 2/2006 |
| JP | 2006-114423 | 4/2006 |
| JP | 2006-229357 | 8/2006 |

* cited by examiner

*Primary Examiner*—Edward Tso
*Assistant Examiner*—M'Baye Diao
(74) *Attorney, Agent, or Firm*—K&L Gates LLP

(57) ABSTRACT

A power supply system is provided. The power supply system includes electronic equipment adapted to control power supply based on battery identification information from a battery installed in a battery housing section; and a power supply plate, the power supply plate including a plate main body installed in the battery housing section of the electronic equipment, and a cable, one end of which is connected to the plate main body and the other end of which is led through a lead-out hole of the battery housing section out of the electronic equipment, the other end also having a connector formed thereon which is connected to a power source, wherein power is supplied from the power source connected to the connector of the power supply plate to the electronic equipment.

7 Claims, 15 Drawing Sheets

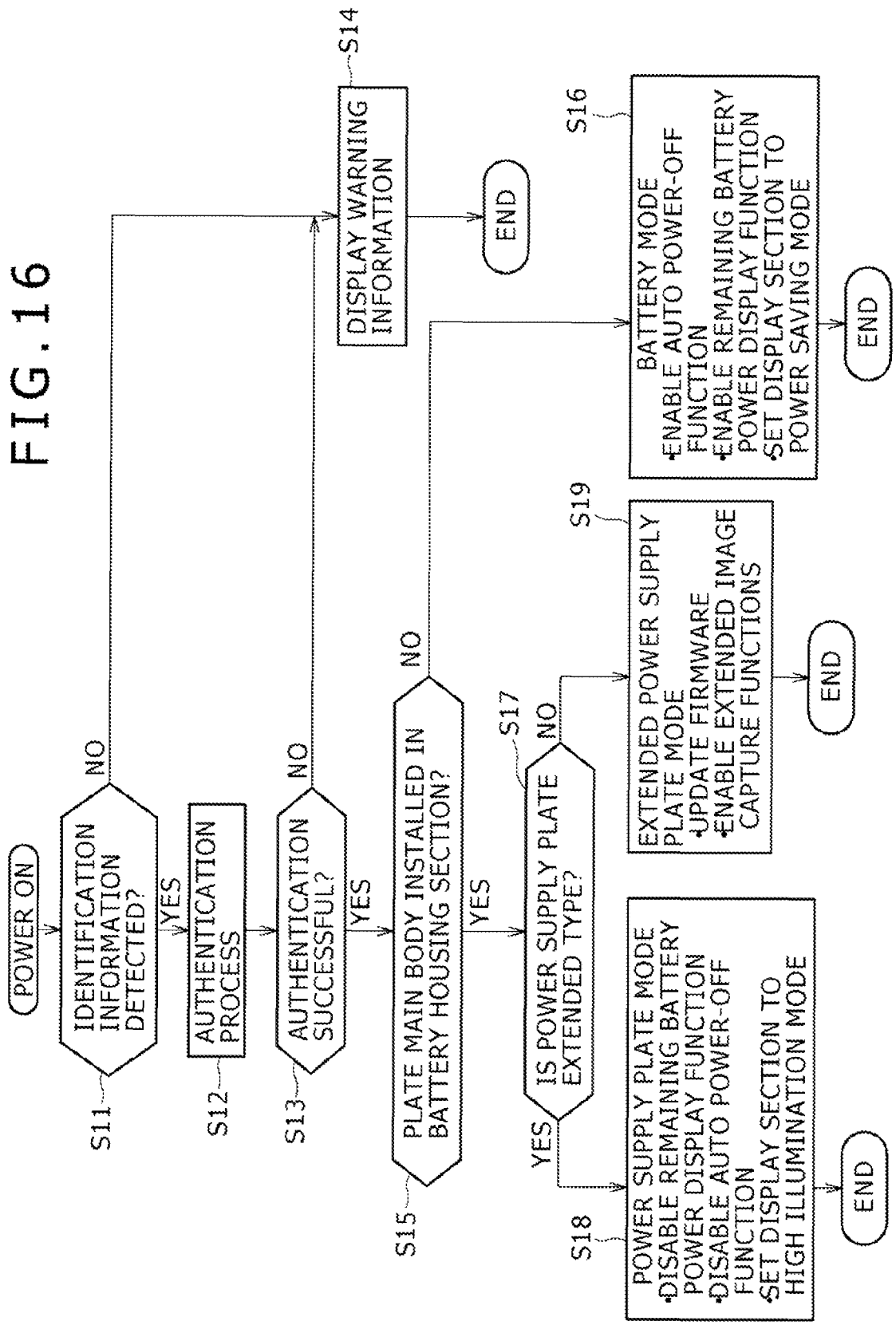

POWER SUPPLY SYSTEM, POWER SUPPLY PLATE AND ELECTRONIC EQUIPMENT

CROSS REFERENCES TO RELATED APPLICATIONS

The present application claims priority to Japanese Patent Application JP 2026-329758 filed in the Japan Patent Office on Dec. 6, 2006, the entire contents of which is being incorporated herein by reference.

BACKGROUND

The present application relates to a power supply system for supplying power via a cable connected to a plate main body which can be installed in a battery housing section of battery-driven electronic equipment, a power supply plate making up the power supply system, and electronic equipment driven by power supplied from the power supply plate.

In a digital camera and other electronic equipment using a primary cell such as dry battery or a secondary cell such as lithium-ion battery, a power supply plate has been used in a battery housing section rather than a primary cell or battery. The power supply plate is designed to supply power from a home power source through a terminal provided on the battery housing section and is used at home and in stores for long hours (See Japanese Patent Laid-open No. 2006-229357 (Patent Document 1)).

Further, among such pieces of equipment there are some that have been proposed to include a lithium-ion battery and power supply plate which have a standardized shape, and a shared housing section capable of accommodating the lithium-ion battery or power supply plate. Electronic equipment having such a shared housing requires no DC power input terminal to be provided on any of the enclosure areas other than the battery housing section, thus permitting size reduction of the enclosure and cost reduction.

With such electronic equipment having a shared housing section, it is necessary to determine whether either the power supply plate's main body or the battery is installed. There are the following existing methods for the electronic equipment to determine which of the battery and power supply plate is installed in the shared housing section.

The first method consists of providing, on the enclosure of each of the battery and the power supply plate, a discrimination groove adapted to identify itself from the other. Alternatively, switches are provided which are adapted to be pressed respectively when the battery and the power supply plate are installed. This allows electronic equipment to determine which of the battery and power supply plate is installed.

The second method consists of disposing output terminals on the battery and the power supply plate at different positions from each other. Then, by disposing input terminals of the shared housing section of electronic equipment at positions associated with the positions of the output terminals, electronic equipment can determine which of the battery and power supply plate is installed.

On the other hand, authentication has been performed between a digital still camera or other electronic equipment and a battery adapted to supply power to the electronic equipment to verify whether the battery is an authentic one compatible with specific electronic equipment. This authentication is conducted because some non-authentic batteries do not include a protective circuit to prevent overcharge or overcurrent.

For this reason, authentic and dedicated batteries have included an information output terminal adapted to output their identification information, in addition to positive and negative terminals for purposes of power supply. Such electronic equipment performs an authentication process to verify whether the attached battery is authentic based on the battery identification information from the information output terminal.

Further, it has been common to perform authentication between portable electronic equipment and a battery adapted to supply power to the electronic equipment to verify whether the battery is an authentic one compatible with specific electronic equipment. This authentication is conducted because some non-authentic batteries do not include a protective circuit to prevent overcharge or overcurrent.

For this reason, authentic and dedicated batteries have included an information output terminal adapted to output their identification information, in addition to positive and negative terminals for purposes of power supply. Portable electronic equipment performs an authentication process to verify whether the attached battery is authentic based on the battery identification information from the information output terminal.

SUMMARY

Electronic equipment in the related art determines based on the discrimination groove or output terminal position that the power supply plate is installed in the shared housing section. Here, if we assume that a battery is installed in the shared housing section of electronic equipment and that the battery has a discrimination groove similar to that of the power supply plate or an output terminal at a position similar to that for the power supply plate, the electronic equipment determines that the power supply plate is installed. As a result, power is supplied from the battery. That is, the electronic equipment determines that the power supply plate is installed even if a non-authentic battery is installed. Thus, providing a specific shape to the shared housing section of electronic equipment alone cannot ensure high accuracy in authenticity verification of the installed battery.

In an embodiment, it is desirable to provide a power supply system for verifying battery authenticity with high accuracy and supply power from an external power source to battery-driven electronic equipment, a power supply plate installed in the same and electronic equipment powered by the same.

In an embodiment, a power supply system is provided. The power supply system includes electronic equipment adapted to control power supply based on battery identification information from a battery installed in a battery housing section. The power supply system further includes a power supply plate. The power supply plate includes a plate main body installed in the battery housing section of the electronic equipment. The power supply plate further includes a cable. One end of the cable is connected to the plate main body. The other end thereof is led through a lead-out hole of the battery housing section out of the electronic equipment. The other end also has the connector formed thereon which is connected to the power source. The power supply system supplies power from the power source connected to the connector of the power supply plate to the electronic equipment. The plate main body of the power supply plate has an information output section adapted to read identification information of the power supply plate from a storage medium and output the information to the electronic equipment in which the plate main body is installed. The electronic equipment includes an authentication process section and a control section. The authentication process section is adapted to determine, based on power supply plate identification information from the information output section of the plate main body and battery identification information from the battery, which of the battery and the plate main body is installed in the shared housing section. The control section is adapted to control power supply from either the battery or the power supply plate according to the authentication result of the authentication process section.

An embodiment is also a power supply plate operable to supply power from a power source connected to a connector of a power supply plate to electronic equipment. The power supply plate includes a plate main body installed in a battery housing section of the electronic equipment adapted to control power supply based on battery identification information from a battery. The power supply plate further includes a cable. One end of the cable is connected to the plate main body. The other end thereof is led through a lead-out hole of the battery housing section out of the electronic equipment. The other end also has the connector formed thereon which is adapted to connect to the power source. The plate main body has an information output section. The information output section is adapted to read identification information of the power supply plate from a storage medium and output the information to the electronic equipment in which the plate main body is installed. The information output section is also adapted to cause the electronic equipment to control power supply based on the output identification information of the power supply plate.

An embodiment is also electronic equipment operable to control power supply based on battery identification information from a battery installed in a battery housing section. The electronic equipment includes an authentication process section and a control section. The authentication process section is adapted to determine which of the battery and the plate main body is installed in the shared housing section. The authentication process section performs this verification based on power supply plate identification information from a power supply plate having a plate main body installed in the battery housing section of the electronic equipment which is connected, via a cable, to a connector connected to a power source and battery identification information from the battery installed in the battery housing section. The control section is adapted to control power supply from either the battery or the power supply plate according to the authentication result of the authentication process section.

Additional features and advantages are described herein, and will be apparent from, the following Detailed Description and the figures.

BRIEF DESCRIPTION OF THE FIGURES

FIG. 16 is a flowchart illustrating steps of the authentication process performed primarily by an authentication process section and a power control section.

DETAILED DESCRIPTION

The present application performs authentication to determine, based on power supply plate identification information from a power supply plate whose plate main body is installed in a battery housing section of electronic equipment, which of the battery and the power supply plate is installed in the battery housing section. Power supply is controlled according to this authentication result, thus ensuring high accuracy in authenticity verification of the battery and power supply plate connected to electronic equipment.

The power supply plate to which the present application is applied will be described below in detail with reference to the accompanying drawings. The power supply plate to which the present application is applied is approximately identical in shape and size to a secondary cell which is installed in the battery housing section of electronic equipment. The power supply plate is installed in the battery housing section for use in place of a secondary cell. In an embodiment, an example of the shape of the power supply plate will be described. Next, an authentication process will be described which is carried out between the power supply plate and electronic equipment supplied with power from a plate main body of the power supply plate installed therein.

<Power Supply Plate Shape>

Figure 1:
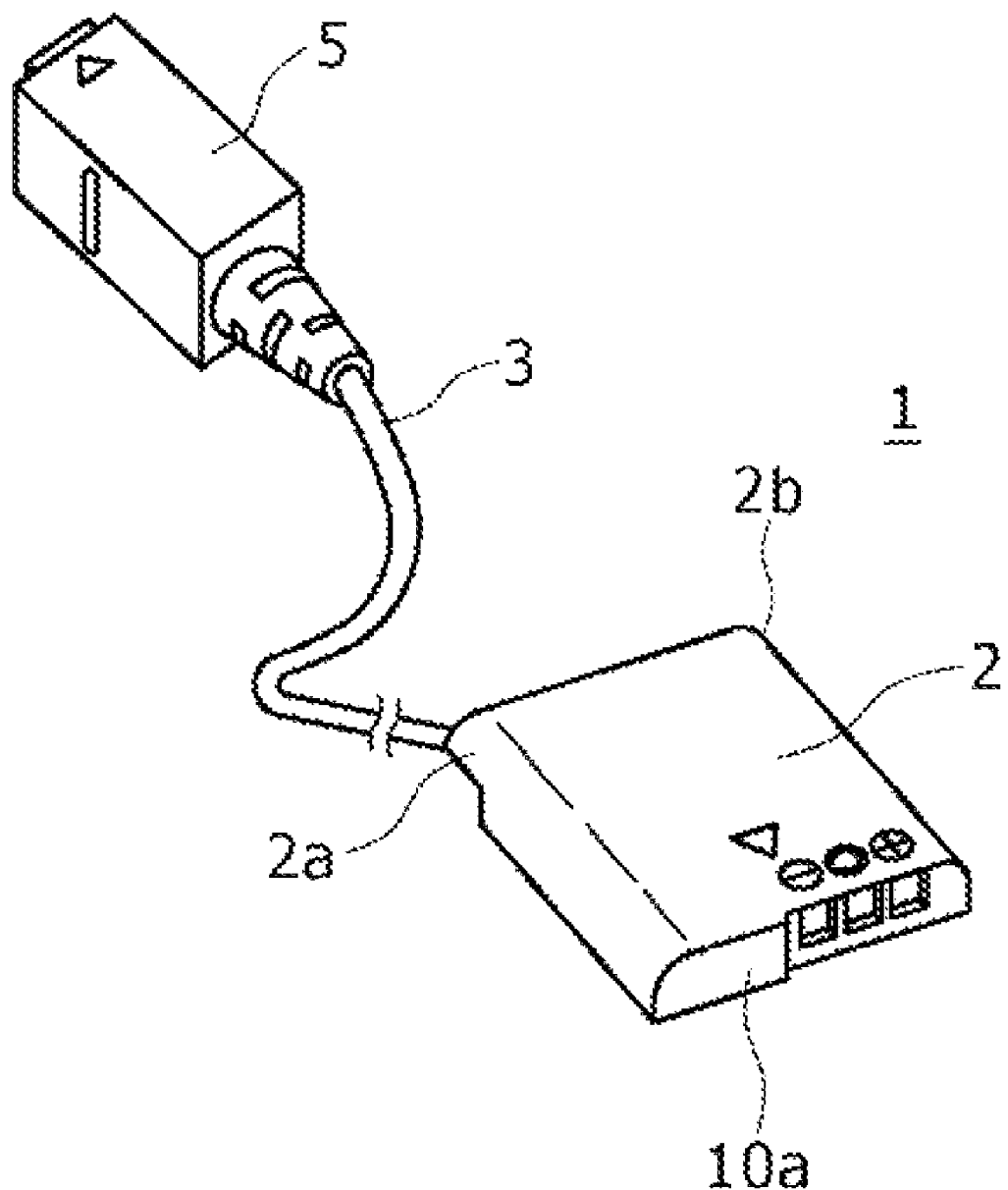
FIG. 1 is a perspective view illustrating a power supply plate to which the present application is applied.

A power supply plate 1 includes a plate main body 2 formed as a whole in the shape of a rectangular flat plate and a cable 3 led out from the plate main body 2 for connection with a power source as illustrated in FIG. 1. The cable 3 has a connector 5 formed at the tip thereof which is connected to an AC/DC converter 4.

Figure 2:
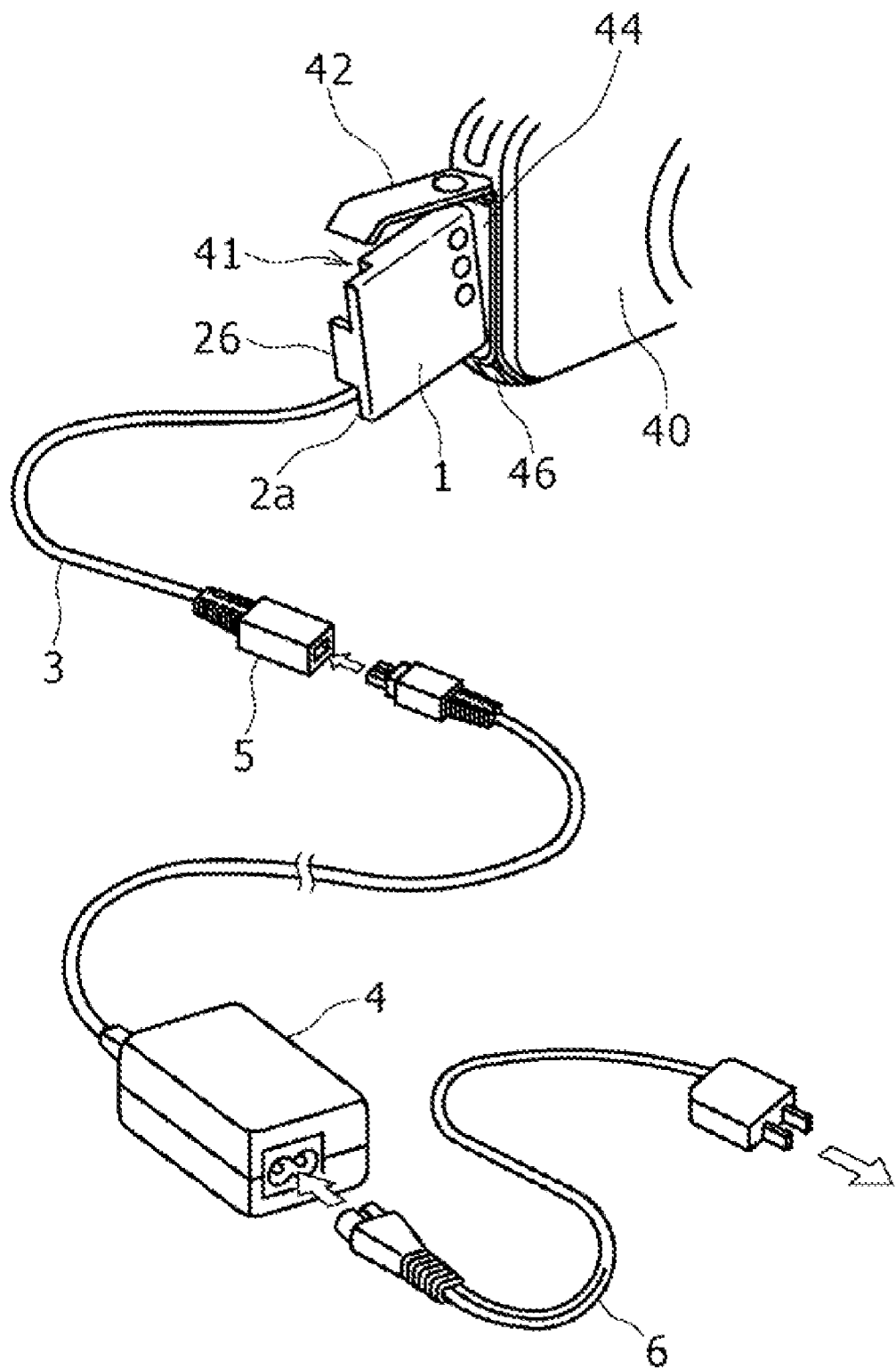
FIG. 2 is a perspective view illustrating the power supply plate, as used, to which the present application is applied.

As illustrated in FIG. 2, the power supply plate 1 is connected to the AC/DC converter 4 via the connector 5. At the same time, a cord 6 connected to a home outlet is connected to the AC/DC converter 4. As a result, the power supply plate 1 is connected to a power source. This allows the power supply plate 1 to supply power from a home power source to electronic equipment, thus permitting electronic equipment to be continuously driven without concern for remaining battery power.

Figure 3:
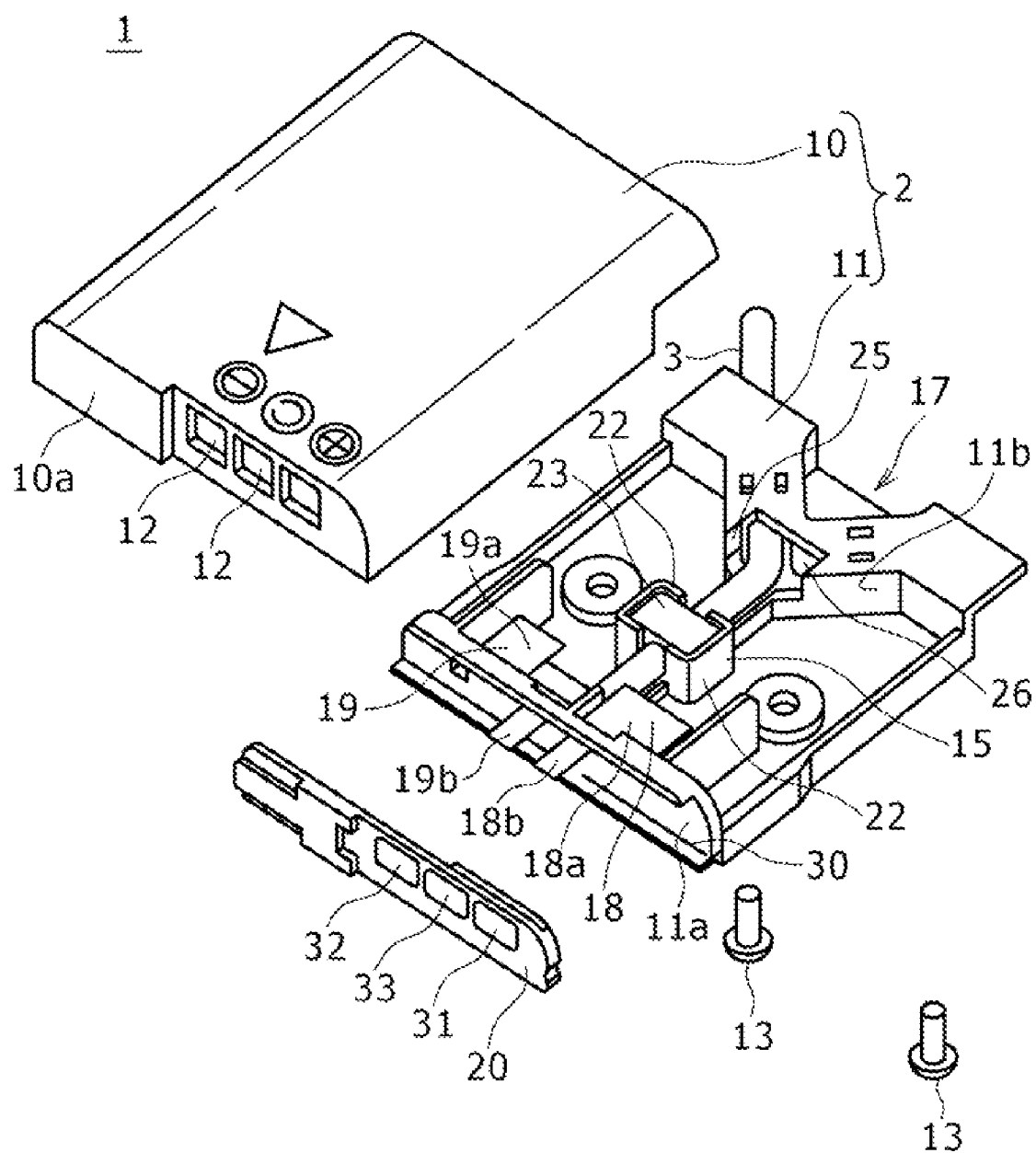
FIG. 3 is an exploded perspective view illustrating the power supply plate to which the present application is applied.
Figure 4:
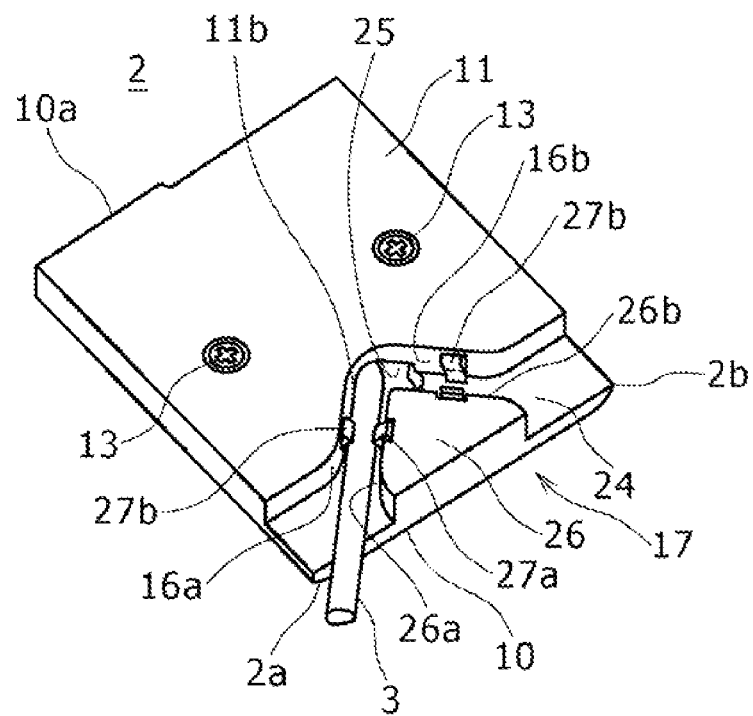
FIG. 4 is a perspective view illustrating the power supply plate from the bottom side thereof to which the present application is applied.
Figure 5:
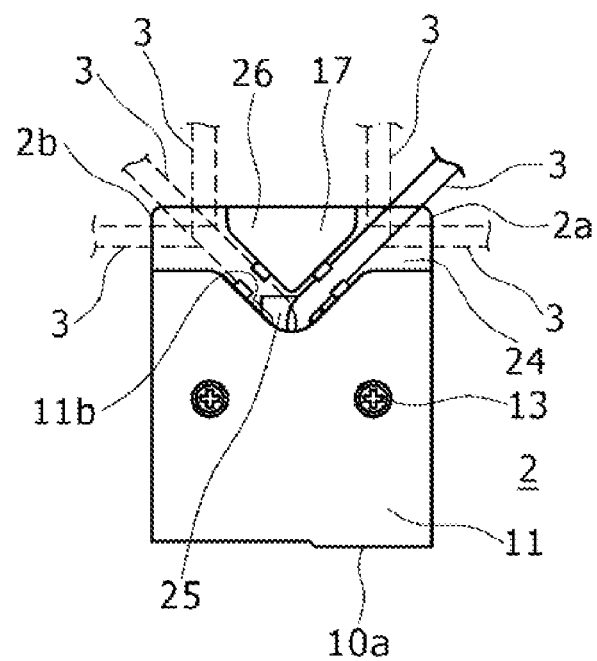
FIG. 5 is a bottom view illustrating the direction in which a cable is led out.

The plate main body 2 of the power supply plate 1 is formed in the shape of an approximately rectangular flat plate as a pair of upper and lower halves 10 and 11 which are butt-joined as illustrated in FIGS. 3 to 5. The upper half 10 has a front wall 10a formed thereon which serves as an insertion end to a battery housing section 41 of electronic equipment. The front wall 10a has a plurality of terminal holes 12 formed thereon which respectively cause positive, negative and information transfer terminal sections 31, 32 and 33 to face front. The same sections 31, 32 and 33 come in contact with power terminals of electronic equipment provided in the battery housing section 41. Further, the upper half 10 is formed thin as it rises in the direction of thickness in the rear on both sides thereof. As a result, the upper half 10 makes up a lead-out region 24 of the cable 3 which will be described later. It should be noted that the upper half 10 has bosses which are not shown. This allows the upper half 10 to be connected to the lower half 11 by screws 13 which are inserted from the side of the lower half 11 and screwed.

Further, the lower half 11 has a holding section 15 and a lead-out section 17 formed thereon. The holding section 15 holds the cable 3 connected to a power source by clamping the cable. The lead-out section 17 has a lead-out path 16 adapted to restrict the direction in which the cable 3 is led out. Still further, the lower half 11 has a front wall 11a formed thereon which serves as an insertion end to the battery housing section as with the upper half 10. Positive and negative tabs 18 and 19, connected to lead wires of the cable 3, are inserted into the lower half 11. The lower half 11 supports a terminal plate 20 which has the positive, negative and information transfer terminal sections 31, 32 and 33 formed thereon.

The holding section 15 holding the cable 3 is provided approximately at the center of the main surface of the lower half 11. The holding section 15 has U-shaped support walls 22 which are provided upright so as to be opposed to each other. A fitting piece 23 fitted onto an outer peripheral portion of the cable 3 is formed so as to be clamped between the support walls 22. The holding section 15 holds the cable 3 inside the plate main body 2 as the fitting piece 23 is clamped between the support walls 22. The holding section 15 prevents breaking or disconnection of the cable 3 due to external force such as tensile force.

The lead-out section 17 is provided in the rear of the plate main body 2 to restrict the direction in which the cable 3, held by the holding section 15, is led out. The area of the lead-out section 17 more rearward than a rear wall 11b of the lower half 11 is formed lower the main surface as illustrated in FIGS. 3 and 4. This allows the lead-out region 24 to be formed in the lead-out section 17. In the lead-out region 24, the cable 3, drawn out from the rear wall 11b, is led out externally. More specifically, the lead-out section 17 has a branch section 26 formed thereon. In the branch section 26, the cable 3, drawn out from an opening portion 25 provided on the rear wall 11b of the lower half 11, is guided to either of corner portions 2a and 2b in the rear of the plate main body 2.

The opening portion 25 is located approximately at the center of the rear wall 11b. The same portion 25 is formed in the shape of an approximate V facing the front wall 11a. The same portion 25 is formed at the frontmost position of the rear wall 11b. The cable 3 held by the holding section 15 is led out from the opening portion 25 to the lead-out region 24.

The branch section 26 is formed more rearward than the rear wall 11b of the lower half 11. The same section 26 is formed in an approximately rectangular shape. The vertex portion thereof confronts the opening portion 25. Further, the branch section 26 has two slanting surfaces extending from the vertex. One of the slanting surfaces is formed to extend toward the corner portion 2a in the rear of the plate main body 2. The other slanting surface is formed to extend toward the corner portion 2b in the rear of the plate main body 2. It should be noted that the base of the rectangular shape of the branch section 26 serves as a rear side edge of the lower half 11. When the upper and lower halves 10 and 11 are joined together, the base of the rectangular shape becomes continuous with the rear wall of the half 10.

As a result, the lead-out section 17 forms, together with the slanting surfaces of the branch section 26 and the rear wall 11b of the lower half 11, lead-out paths 16a and 16b adapted to lead the cable 3 to either of the corner portions 2a and 2b. The lead-out section 17 restricts the cable 3 drawn externally from the opening portion 25 so that the cable is guided to the lead-out path 16a or 16b via the branch section 26. This allows the cable 3 to be led out from either of the corner portions 2a and 2b in the rear of the plate main body 2.

It should be noted that the cable 3 is flexible. Therefore, the part of the cable 3 led out from the opening portion 25 can change its direction from left to right or right to left even when the cable 3 is held by the holding section 15. The cable 3 is restricted by the lead-out section 17 as to the direction in which it is led out. Therefore, the cable 3 can be led out onto the corner portion 2a or 2b in the rear of the plate main body 2. The corner portion 2b is approximately 90 degrees apart from the corner portion 2a as illustrated in FIG. 5. Further, the cable 3 can be led out in any direction, including rearward, sideward and diagonally relative to the plate main body 2, as desired in both of the corner portions 2a and 2b.

Figure 6:
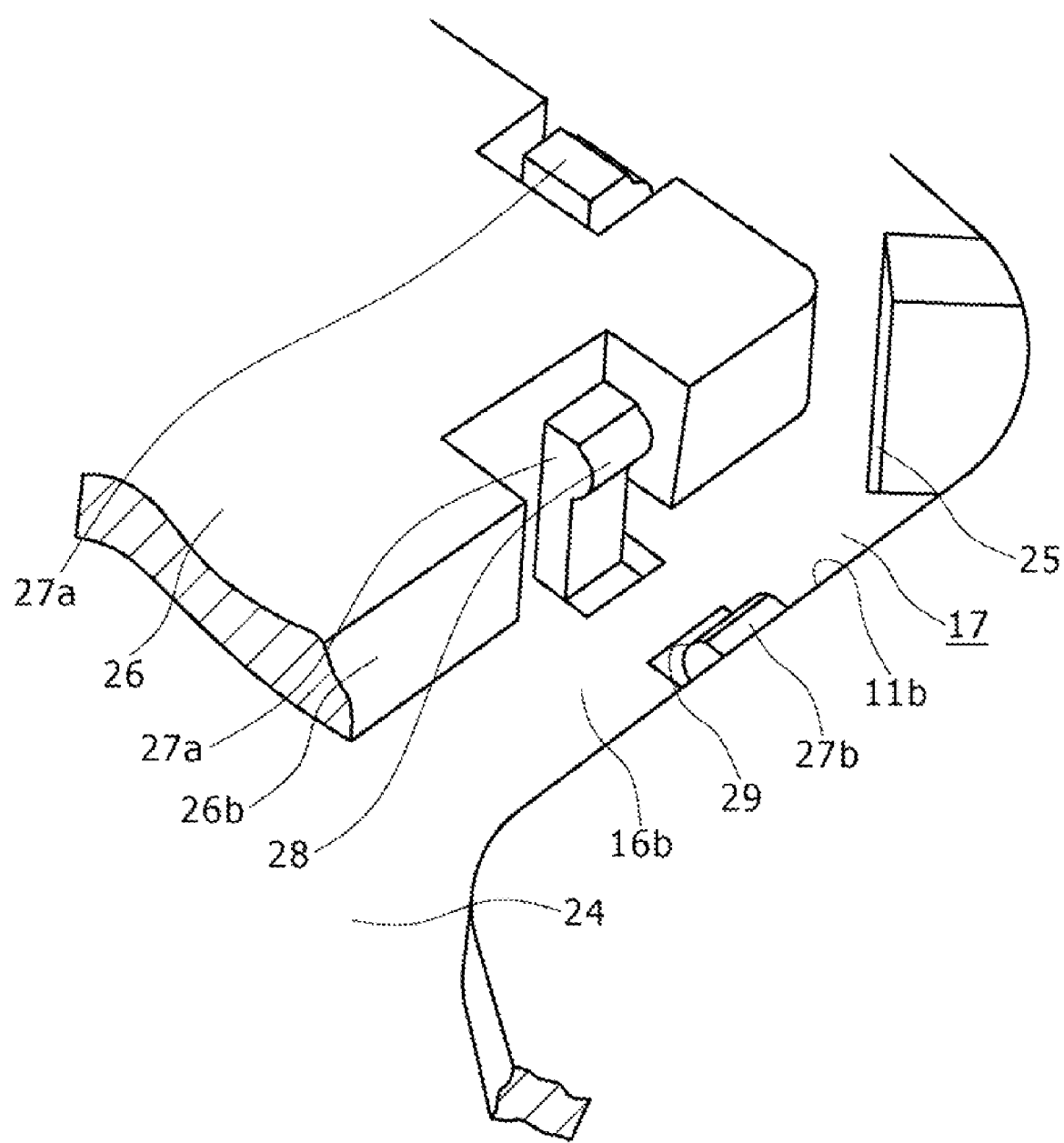
FIG. 6 is a perspective view illustrating clamping pieces.

The lead-out path 16 has clamping pieces 27a and 27b provided upright which are adapted to clamp the cable 3. The clamping pieces 27a and 27b clamp the cable 3 which is restricted by the branch section 26 as to the direction in which it is led out, thus preventing the cable 3 from swinging. The clamping pieces 27a and 27b are provided in each of the lead-out paths 16a and 16b. As illustrated in FIG. 6, the first clamping pieces 27a are provided one on each of side walls 26a and 26b of the branch section 26. The second clamping pieces 27b are provided on the rear wall 11b respectively at positions confronting the side walls 26a and 26b of the branch section 26. The first and second clamping pieces 27a and 27b are provided upright so as to be opposed to each other.

The first clamping piece 27a is provided upright from the lead-out region 24 of the lower half 11. The same piece 27a has a swollen portion 28 formed at its upper part. The swollen portion 28 swells toward the second clamping piece 27b so as to prevent the cable 3 from slipping out. A recessed portion is formed on the side wall 26a of the branch section 26 in such a manner as to surround the first clamping piece 27a. This permits the cable 3 to swing. The second clamping piece 27b has a swollen portion 29 formed thereon. The swollen portion 29 swells from the rear wall 11b toward the first clamping piece 27a.

The first clamping piece 27a clamps the cable 3 as the cable bends to be press-fitted. When clamped by the first clamping piece 27a, the cable 3 is led out onto either of the corner portions 2a and 2b in the rear of the plate main body 2 without swinging.

Insertion holes are formed on the front wall 11a of the lower half 11. The positive and negative tabs 18 and 19 are inserted and held in the insertion holes. The positive and negative tabs 18 and 19 held on the front wall 11a are thin plates made of nickel (Ni) or other metal. The same tabs 18 and 19 respectively have joint plate portions 18a and 19a which are joined to positive and negative lead wires disposed in the lower half 11. The same tabs 18 and 19 further respectively have welding plate portions 18b and 19b which project through the insertion holes of the front wall 11a and are welded to the terminal plate 20. The welding plate portions 18b and 19b are each joined to the terminal plate 20 first. Then, they are guided through the insertion holes of the front wall 11a and bent approximately at 90 degrees so as to lie along the front wall 11a. Finally, the terminal plate 20 is brought in contact with the front wall 11a.

The front wall 11a of the lower half 11 also has a support recessed portion 30 formed on the front side thereof. The same portion 30 supports the terminal plate 20. When the terminal plate 20 is brought in contact with the side edge portion of the front wall 11a, a semiconductor chip mounted to the terminal plate 20 as well as the welding plates welded to the positive and negative tabs 18 and 19 are disposed in the same portion 30.

The terminal plate 20 supported by the front wall 11a is a so-called rigid printed circuit board. The same plate 20 has the positive, negative and information transfer terminal sections 31, 32 and 33 formed thereon. The same sections 31, 32, and 33 face front from the terminal holes 12 of the upper half 10. The positive terminal section 31 is connected to the positive tab 18 with a wiring pattern formed on the board via the welding plate provided in the rear. Similarly, the negative terminal section 32 is connected to the negative tab 19. The information transfer terminal section 33 is an information output terminal adapted to output, for example, identification information of the power supply plate 1. The same section 33 is connected to the semiconductor chip mounted to the terminal plate 20. Further, the same section 33 outputs power supply plate identification information to the electronic equipment, thus allowing an authentication process, which will be described later, to be performed between the power supply plate and the electronic equipment.

In the power supply plate 1 as described above, the cable 3 inserted through the opening portion 25 is held by the holding section 15. Then, the joint plate portions 18a and 19a of the positive and negative tabs 18 and 19 inserted and held in the front wall 11a of the lower half 11 are joined by soldering or other means to the positive and negative lead wires of the cable 3. Next, the welding plate portions 18b and 19b of the positive and negative tabs 18 and 19 which project toward the front of the front wall 11a are overlaid with the welding plates of the terminal plate 20, after which they are welded together by spot welding or other type of welding. This ensures connection between the positive terminal section 31 of the terminal plate 20 and the positive tab 18, and between the negative terminal section 32 thereof and the negative tab 19.

Next, the welding plate portions 18b and 19b are bent so that the terminal plate 20 comes in contact with the front side of the front wall 11a. Finally, the upper and lower halves 10 and 11 are connected together with the screws 13. In the power supply plate 1, as a result, the positive, negative and information transfer terminal sections 31, 32 and 33 of the terminal plate 20 face front from the terminal holes 12 formed on the upper half 10. On the other hand, the terminal plate 20 is clamped between the front wall 11a of the lower half 11 and the front wall 10a of the upper half 10, thus allowing the terminal plate 20 to be positioned in place. Further, the positive, negative and information transfer terminal sections 31, 32 and 33 of the terminal plate 20 do not move out of place when pressed because the pressing force is received by the front wall 11a of the lower half 11.

Figure 7B:
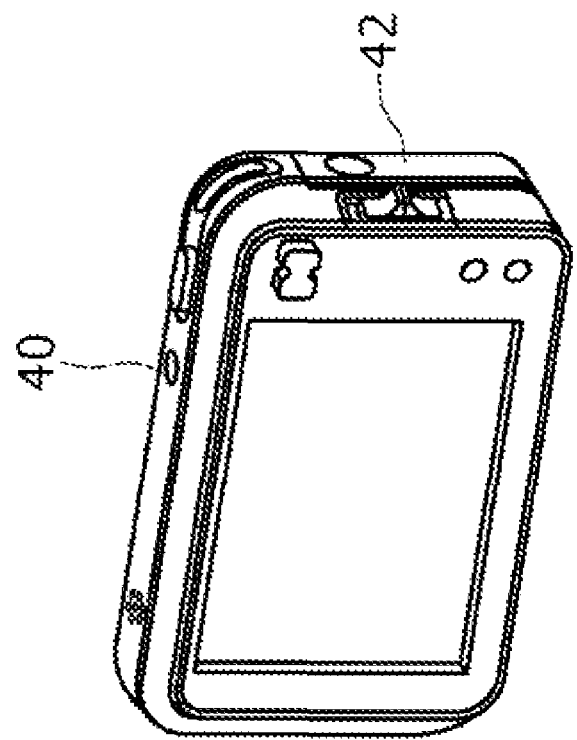
FIGS. 7A and 7B are perspective views illustrating a digital still camera using the power supply plate to which the present application is applied.
Figure 7A:
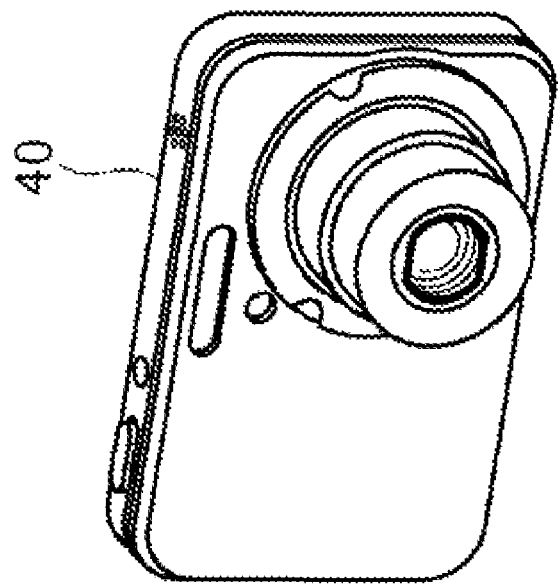
Figure 8:
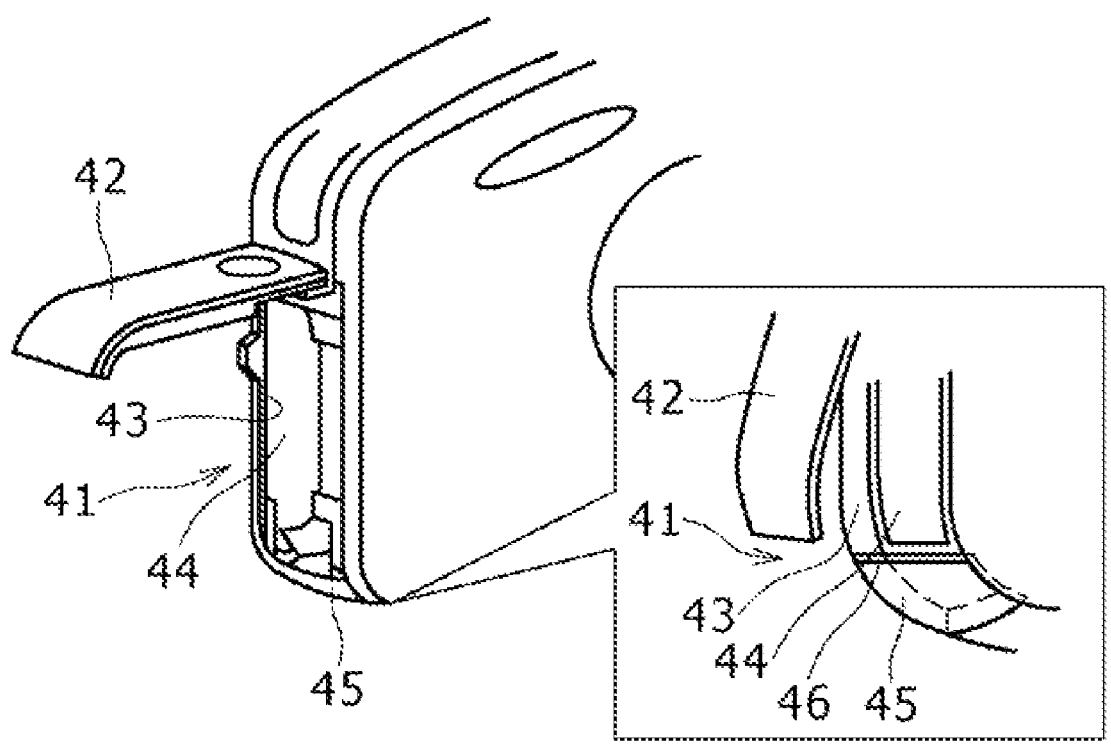
FIG. 8 is a perspective view illustrating a battery housing section.

Next, the battery housing section of electronic equipment using the power supply plate 1 will be described. This electronic equipment is, for example, a digital still camera 40 as illustrated in FIGS. 7A and 7B. The digital still camera 40 has the battery housing section 41 formed on one side thereof as illustrated in FIG. 8. A secondary cell or the power supply plate 1 is inserted into the battery housing section 41. The same section 41 has a recessed surface portion 43 formed on one side of the digital still camera 40. The recessed surface portion 43 has a housing recessed portion 44 and a lead-out hole 45 formed thereon. The housing recessed portion 44 is in an approximately square shape to fit the size of the secondary cell and the power supply plate 1. The lead-out hole 45 is adapted to lead out the cable 3.

Connection sections with the positive, negative and information transfer terminals as well as a biasing member adapted to eject the secondary cell or the power supply plate are provided at the deepest position of the housing recessed portion 44. On the other hand, the same section 44 is opened and closed by a cell cover 42.

The lead-out hole 45 is closed with a cap 46 provided adjacent to the housing recessed portion 44 of the recessed surface portion 43. The cap 46 is made of an elastic member and supported on one side by the digital still camera 40 in a cantilever beam fashion. As a result, the cell cover 42 side of the cap 46 is a free end. As for the lead-out hole 45, when the power supply plate 1 is installed in the housing recessed portion 44 (refer to FIG. 2), the cap 46 bends outwardly to open. This allows the cable 3 to be led out externally.

When a secondary cell is used in the digital still camera 40, the secondary cell is installed in the battery housing section 41 first. The cell is held therein by a locking piece whose details are omitted, after which the cell cover 42 is closed. At this time, the digital still camera 40 is flush with the cell cover 42 as a result of the closing of the cap 46. Therefore, the housing recessed portion 44 is completely closed.

Figure 9:
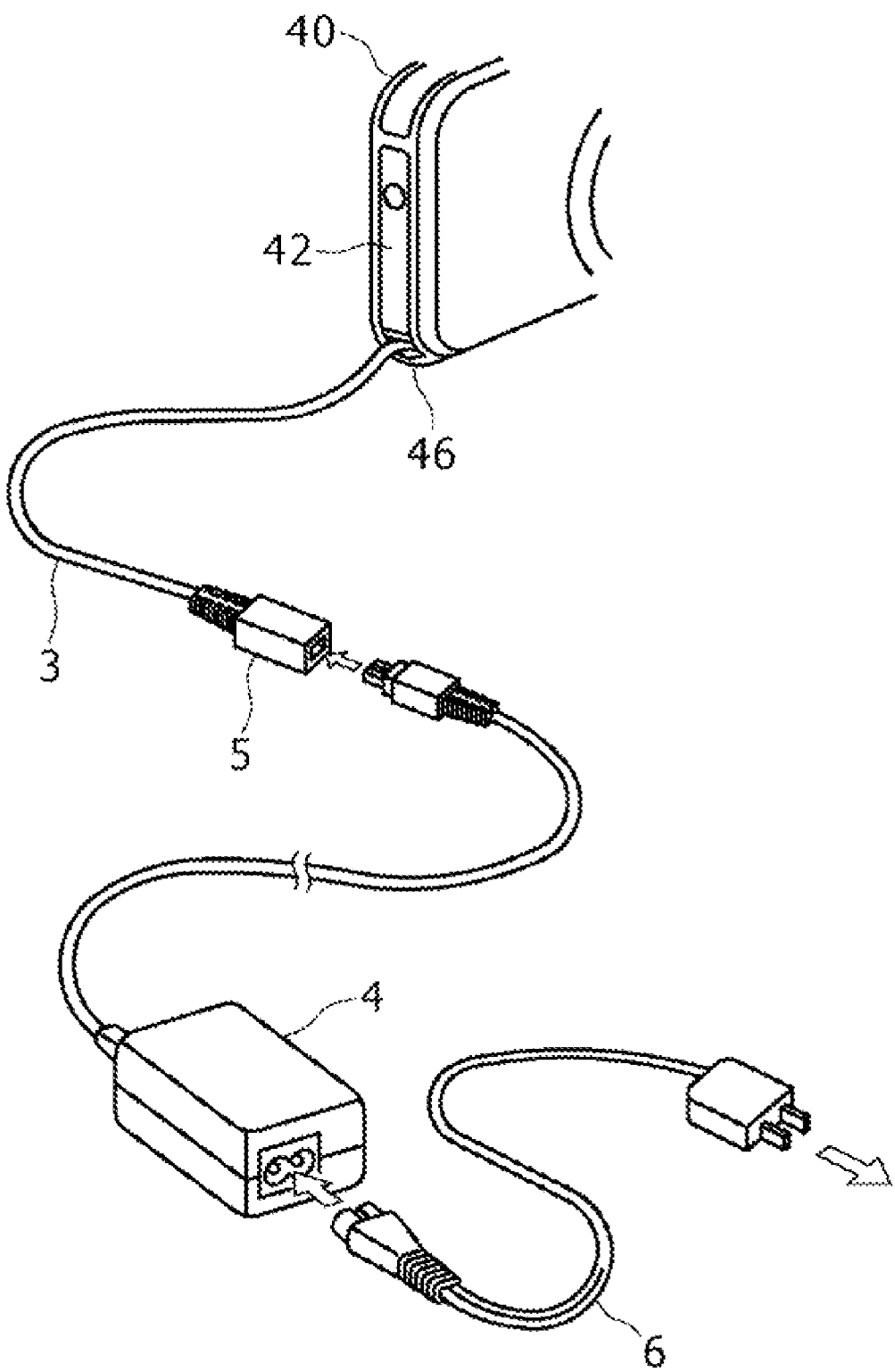
FIG. 9 is a perspective view illustrating the digital still camera with the power supply plate installed in the battery housing section.
Figure 10:
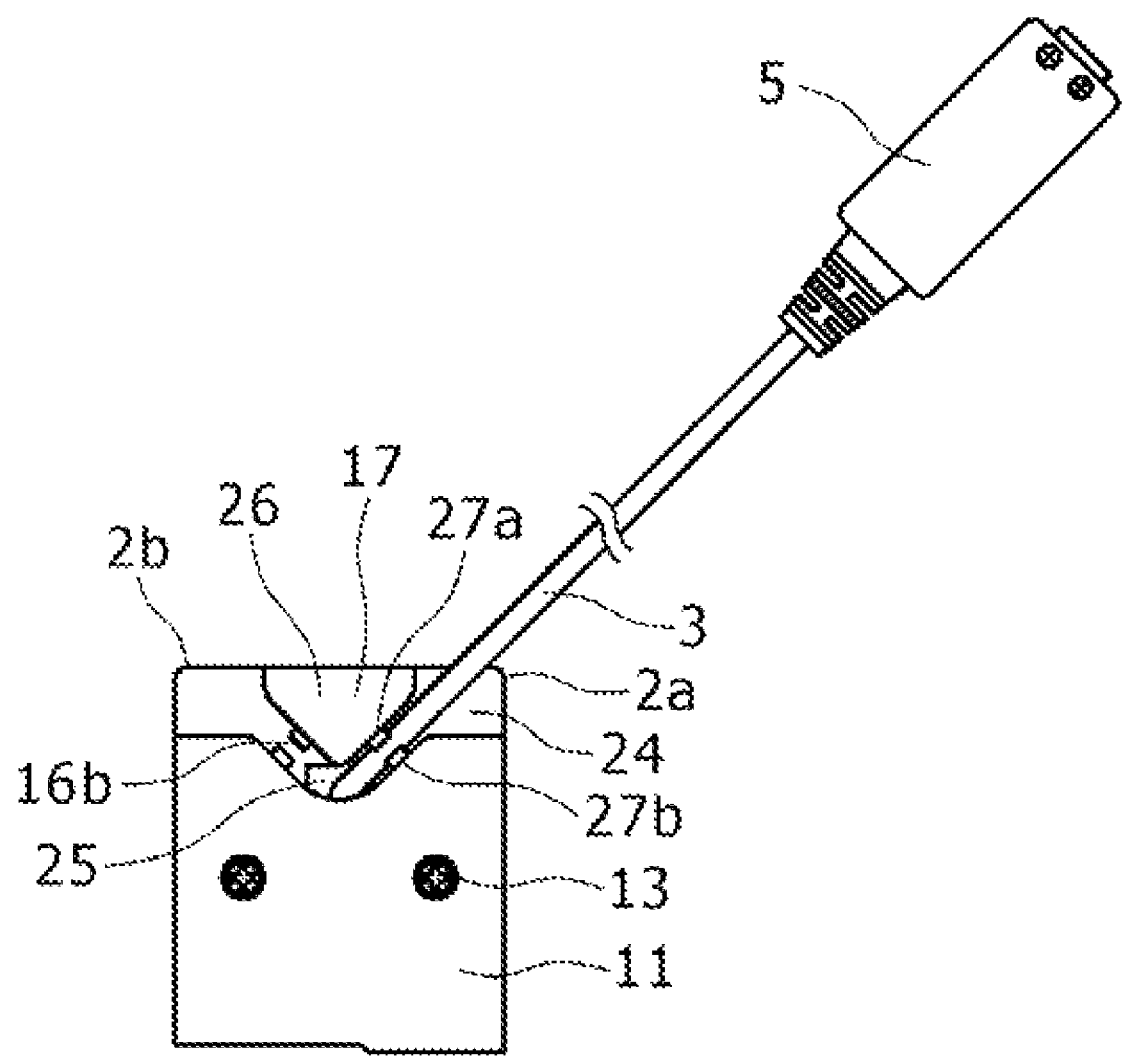
FIG. 10 is a bottom view illustrating the power supply plate in which the cable is led out from one of corner portions thereof.

On the other hand, when the plate main body 2 of the power supply plate 1 is installed in the battery housing section 41 of the digital still camera 40, the direction in which to lead out the cable 3 is changed by the lead-out section 17 according to the direction in which the lead-out hole 45 is formed on the battery housing section 41. More specifically, when the plate main body 2 is installed in the battery housing section 41 of the digital still camera 40, the cable 3 is led out onto one of the corner portions or the corner portion 2a as illustrated in FIGS. 2 and 9.

The plate main body 2 of the power supply plate 1 is installed in the housing recessed portion 44, and the cable 3 is led out from the lead-out hole 45. At this time, the cap 46 of the digital still camera 40 bends outwardly. This allows the cable 3 to be led out externally. Then, the power supply plate 1 is connected to the AC/DC converter 4 via the connector 5. At the same time, the cord 6 connected to a home outlet is connected to the AC/DC converter 4. As a result, the power supply plate 1 is connected to a power source. This allows the power supply plate 1 to supply power from the home power source to the digital still camera 40, thus permitting the same camera 40 to be continuously driven without concern for remaining battery power.

The cable 3 of the power supply plate 1 is restricted by the lead-out section 17 so that it is led out in the direction of the corner portion 2a according to the position of the lead-out hole 45 of the digital still camera 40. As a result, the cable 3 can be led out externally without any twisting or bending even with the power supply plate 1 installed in the battery housing section 41. Therefore, the power supply plate 1 permits power to be supplied from the home power source while at the same time preventing damage or excessive load to the cable 3 and the battery housing section 41.

Figure 11:
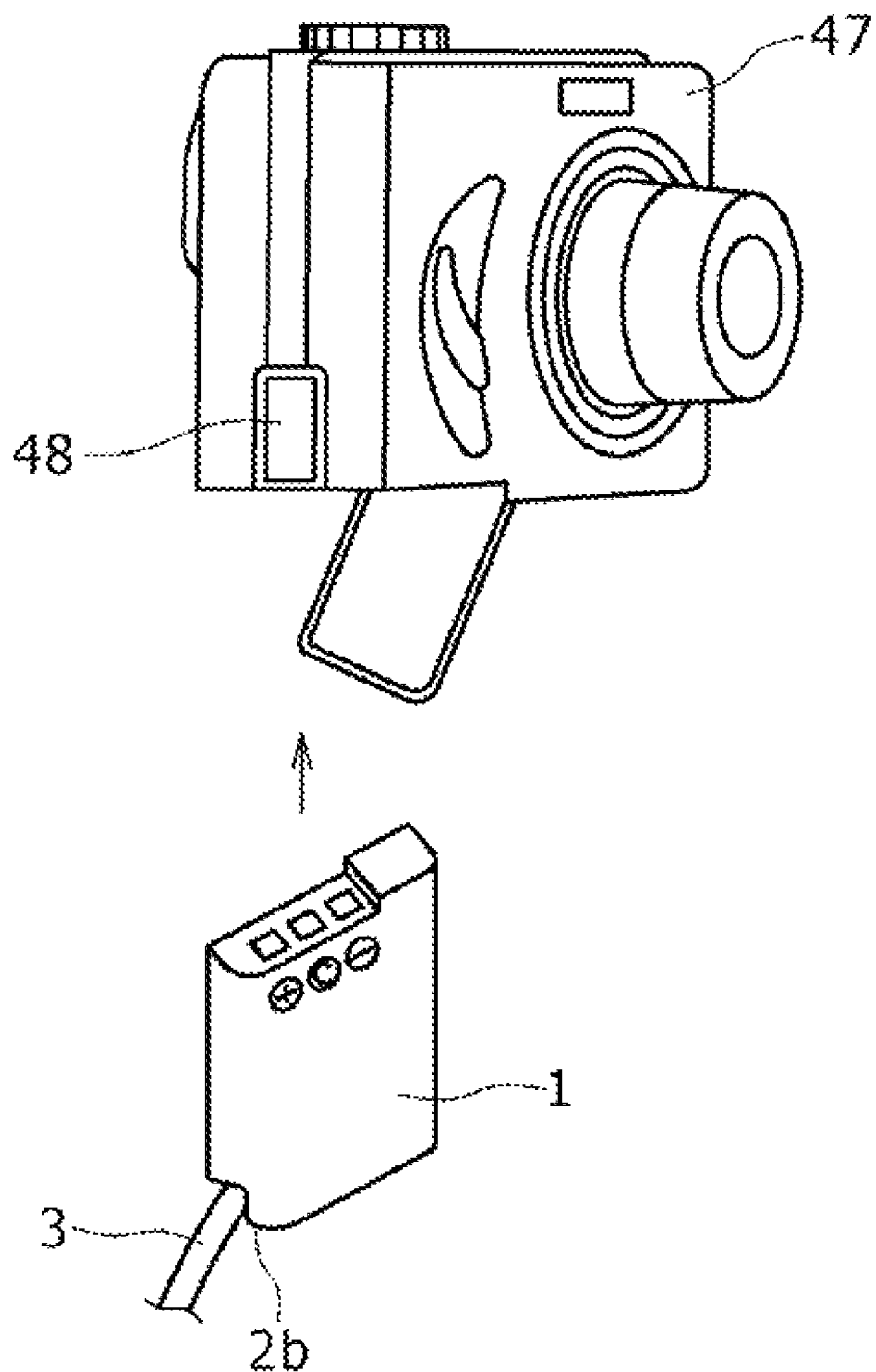
FIG. 11 is a perspective view illustrating another digital still camera using the power supply plate to which the present application is applied.
Figure 12:
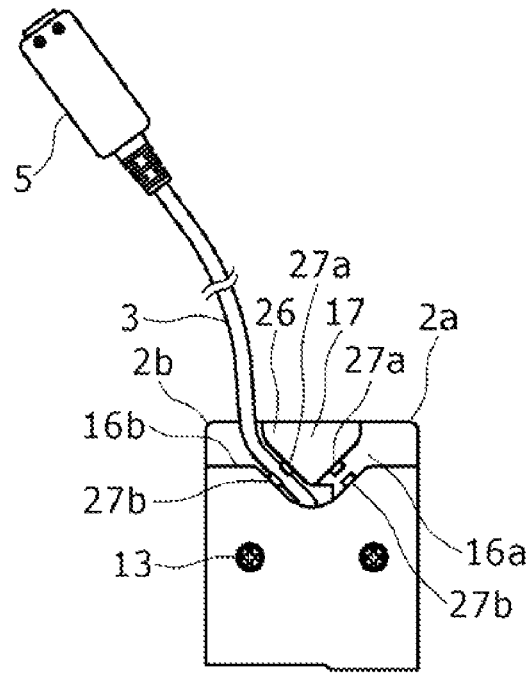
FIG. 12 is a bottom view illustrating the power supply plate in which the cable is led out from the other corner portion thereof.

On the other hand, if the power supply plate 1 is used in other electronic equipment whose battery housing section 41 is formed to the same specification, the direction in which to lead out the cable 3 is changed to suit the lead-out hole formed on the other electronic equipment. For example, if the power supply plate 1 is installed in the battery housing section of a digital still camera 47 illustrated in FIG. 11, the cable 3 is led out onto the other corner portion 2*b* as illustrated in FIG. 12 to suit a lead-out hole 48 of the cable 3. This allows the power supply plate 1 to be installed in the battery housing section of the digital still camera 47 without any twisting or bending of the cable 3.

Thus, the power supply plate 1 can be installed in the battery housing section of other model. Further, the power supply plate 1 permits change in the direction in which to lead out the cable 3 from the plate main body 2 to suit the lead-out hole of the cable provided on each model. As a result, there is no need to have a dedicated power supply plate ready for each model. Therefore, if long hours of power supply are required as when a plurality of different models are put on display in a mass volume retailer, there is no need to prepare a dedicated power supply plate for each model. Moreover, it is possible to prevent installation of a wrong type of power supply plate.

Figure 13:
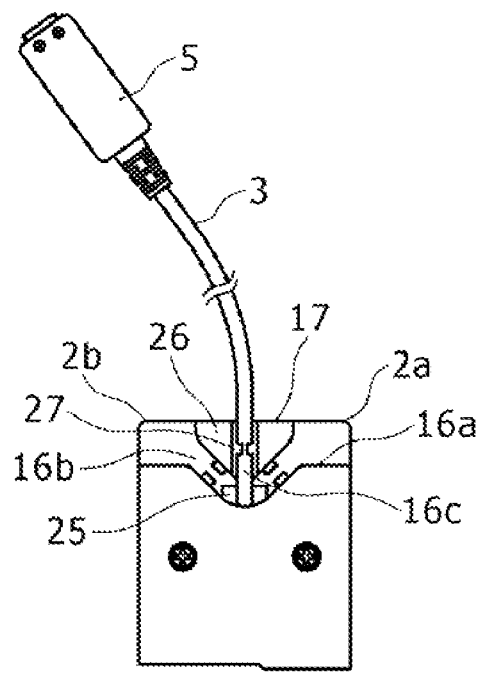
FIG. 13 is a bottom view illustrating the power supply plate having a third lead-out path leading toward the rear side of a plate main body.

It should be noted that, in an embodiment, the led-out part of the cable 3 may be not only guided to either of the corner portions 2*a* and 2*b* in the rear of the plate main body but also led out, for example, rearward by the branch section as illustrated in FIG. 13.

In this case, the lead-out paths 16*a* and 16*b* are formed between the branch section and the rear wall 11*b* of the lower half 11. Further, a third lead-out path 16*c* is formed so as to confront the opening portion 25. The clamping piece 27*a* or 27*b* may be formed on the third lead-out path 16*c*.

Due to the lead-out section 17 having the third lead-out path 16*c*, the power supply plate has more options as to the direction in which to lead out the cable 3. Further, the power supply plate can be shared between a plurality of pieces of electronic equipment having the cable lead-out hole formed at different positions of the battery housing section.

<Authentication between Power Supply Plate and Electronic Equipment>

Next, the authentication process will be described which is carried out between the power supply plate according to an embodiment and electronic equipment which is supplied with power from the plate main body of the power supply plate installed therein.

Figure 14:
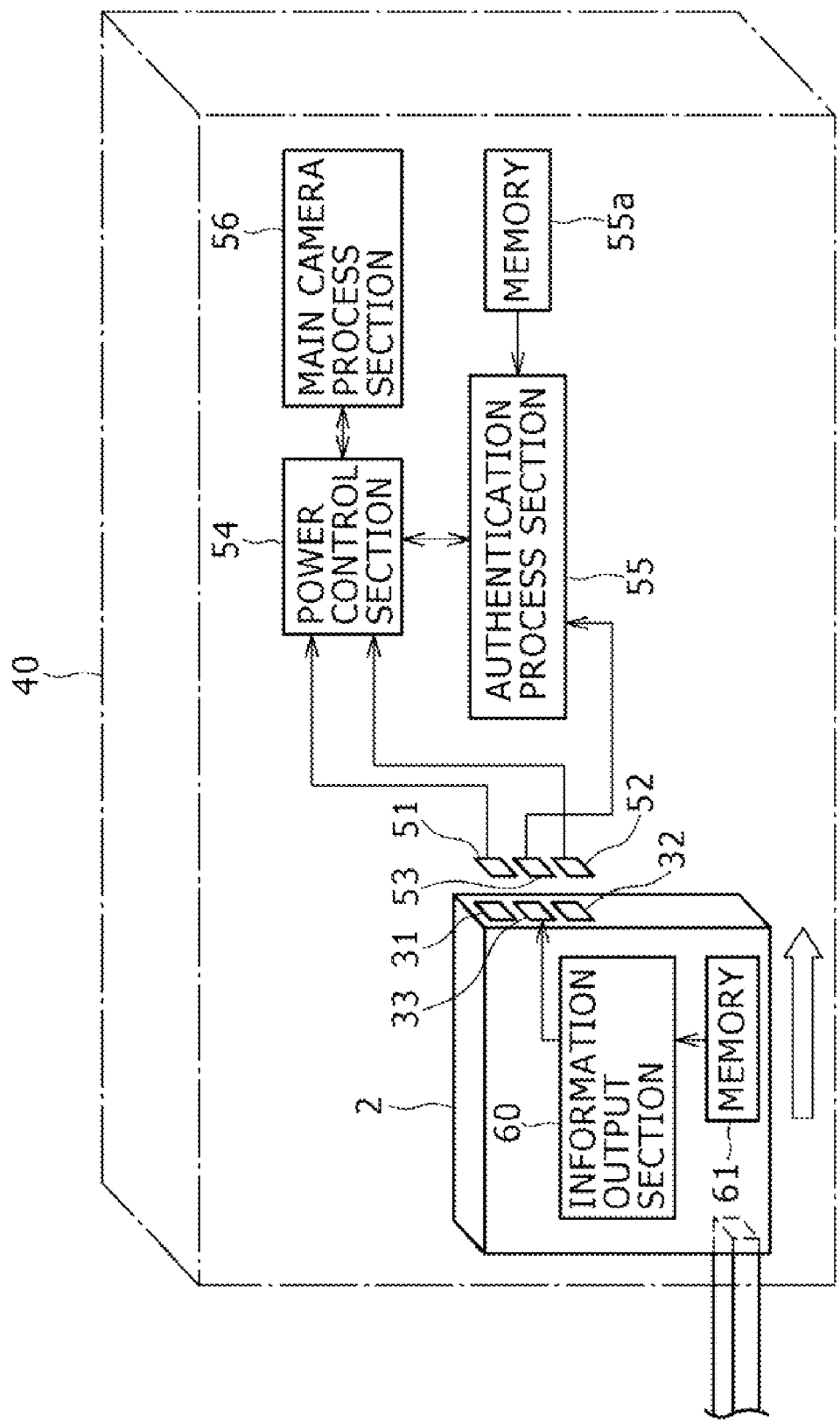
FIG. 14 is a schematic view describing the configuration of the digital still camera and power supply plate for proceeding with an authentication process.

To proceed with the authentication process, the power supply plate 1 and the digital still camera 40 are configured as illustrated in FIG. 14.

That is, the plate main body 2 of the power supply plate 1 includes an information output section 60 adapted to output identification information of the power supply plate to the digital still camera 40. Here, identification information of the power supply plate refers to information which is recorded in advance to a memory 61 capable of accessing the information output section 60, for example, at the time of shipment. This information is associated with a specific model of electronic equipment. It should be noted that, in the present embodiment, electronic equipment associated with the power supply plate is, for example, the aforementioned digital still camera 40 or 47. In other words, identification information of the power supply plate indicates to the digital still camera 40 or 47 that the power supply plate is authentic.

The information output section 60 and the memory 61 storing identification information of the power supply plate are incorporated in the semiconductor chip which is mounted to the terminal plate 20. The information output section 60 is activated when the semiconductor chip is supplied with power, for example, from a home power source. The same section 60 reads identification information of the power supply plate from the memory 61 and outputs this information externally from the information transfer terminal section 33.

Figure 15A:
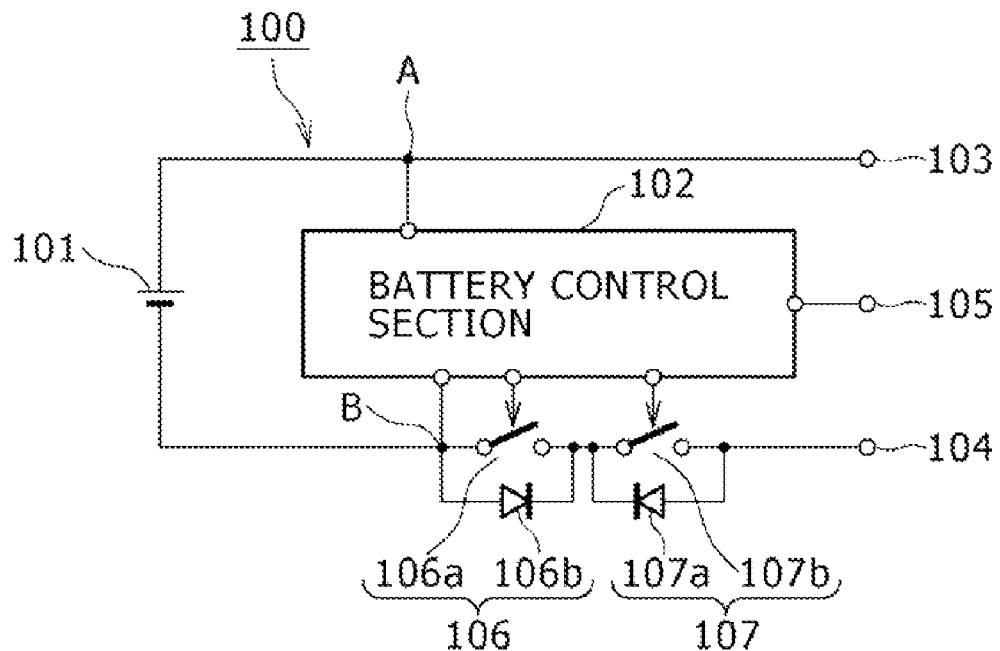
FIG. 15A is a schematic view illustrating a power supply circuit included in an existing battery.

More specifically, the plate main body 2 includes circuitry which will be described below. It should be noted that, prior to the description of plate main body 2, the configuration of the power circuit of a battery pack 100 connected to the battery housing section 41 of the digital still camera 40 will be described as an example of the related art with reference to FIG. 15A.

The battery pack 100 includes a battery cell 101 adapted to generate an electromotive force by chemical reaction, a battery control section 102 adapted to control the charge and discharge of the battery cell 101 and output identification information and remaining power of the battery to the digital still camera 40, a positive terminal 103 which is the positive external output terminal of the battery cell 101 and a negative terminal 104 which is the negative external output terminal of the battery cell 101. The battery pack 100 also includes an information output terminal 105 adapted to externally output information from the battery control section 102, a discharge control circuit 106 adapted to prevent overdischarge of the battery cell 101 and a charge control circuit 107 adapted to prevent overcharge of the battery cell 101.

The positive side of the battery cell is connected to the battery control section 102 and the positive terminal 103 via a branch A. The negative side of the battery cell is connected to the battery control section 102 and the negative terminal 104 via a branch B.

The discharge control circuit 106 is connected in series between the branch B and the negative terminal 104. The same circuit 106 includes a switch 106*a* whose on/off state is controlled by the battery control section 102 and a diode 106*b* connected in parallel with the switch 106*a*. The diode 106*b* is arranged to be reverse-biased with respect to the discharge direction of the battery cell 101.

In the discharge control circuit 106 under normal condition, when the battery cell 101 approaches an overdischarged state after the switch 106*a* is switched on by the battery control section 102, the switch 106*a* is switched off by the battery control section 102, thereby preventing overdischarge of the battery cell 101. Further, the discharge control circuit 106 can cause a current to flow in the charge direction via the diode 106*b* to prevent overdischarge even after the switch 106*a* is switched off. This makes it possible to charge the battery cell 101 from an almost overdischarged condition, thus restoring the battery cell 101 back to normal operation.

The charge control circuit 107 is connected in series between the branch B and the negative terminal 104, as with the discharge control circuit 106. The same circuit 107 includes a switch 107*a* whose on/off state is controlled by the battery control section 102 and a diode 107*b* connected in parallel with the switch 107*a*. The diode 107*b* is arranged to be forward-biased with respect to the discharge direction of the battery cell 101. In other words, it is arranged to be reverse-biased with respect to the charge direction of the cell 11.

In the charge control circuit 107 under normal condition, when the battery cell 101 approaches an overcharged state after the switch 107a is switched on by the battery control section 102, the switch 107a is switched off by the battery control section 102, thereby preventing overcharge of the battery cell 101. Further, the charge control circuit 107 can cause a current to flow in the discharge direction via the diode 107b to prevent overcharge even after the switch 107a is switched off. This makes it possible to discharge the battery cell 101 from an almost overcharged condition, thus restoring the battery cell 101 back to normal operation.

Figure 15B:
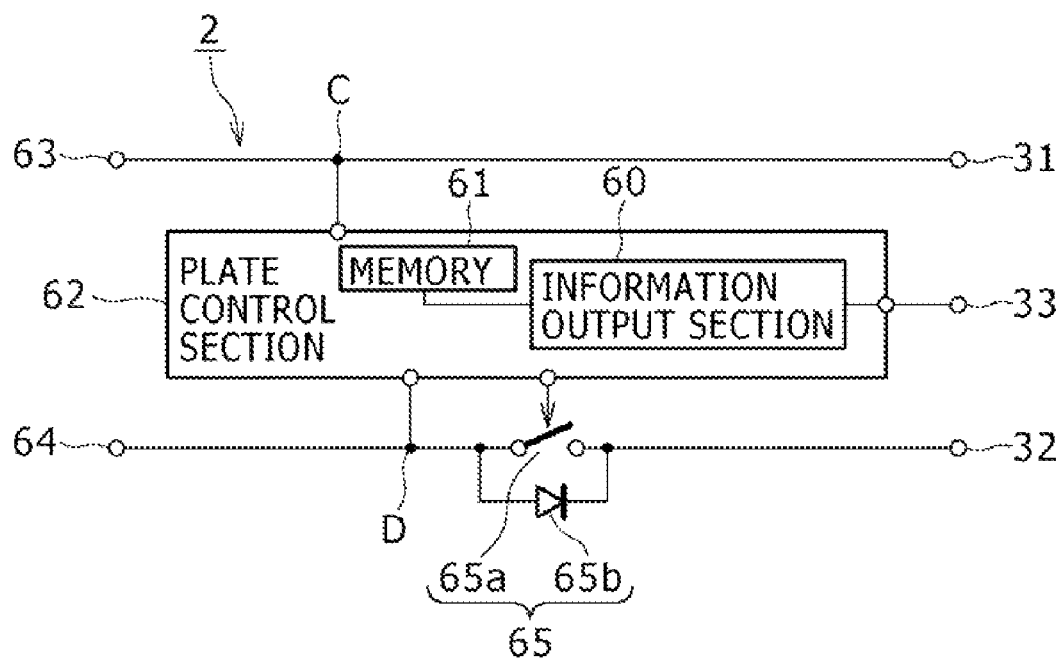
FIG. 15B is a schematic view illustrating the power supply circuit included in the plate main body of the power supply plate to which the present application is applied.

In contrast, the plate main body 2 of the power supply plate 1 according to the present embodiment includes, as illustrated in FIG. 15B, a plate control section 62 adapted to control power supply to the digital still camera 40 and a positive connection terminal 63 connected to the positive terminal of the AC/DC converter 4. The plate main body 2 further includes a negative connection terminal 64 connected to the negative terminal of the AC/DC converter 4 and a discharge control circuit 65.

The plate control section 62 is a process section which includes the functions of the information output section 60 and the memory 61. The same section 62 outputs information such as plate identification information to the digital still camera 40 via the information transfer terminal section 33.

In the plate main body 2, the positive connection terminal 63 is connected to the plate control section 62 and the positive terminal 31 via a branch C. Also in the plate main body 2, the negative connection terminal 64 is connected to the plate control section 62 and the negative terminal section 32 via a branch D.

The discharge control circuit 65 is connected in series between the branch D and the negative terminal section 32. The same circuit 65 includes a switch 65a whose on/off state is controlled by the plate control section 62 and a diode 65b connected in parallel with the switch 65a. Here, the diode 65b is arranged to be reverse-biased. In the discharge control circuit 65 under normal condition, when the AC/DC converter 4 approaches an overcurrent or overvoltage state after the switch 65a is switched on, the switch 65a is switched off by the plate control section 62. It should be noted that there is no need to provide the discharge control circuit 65 in the plate main body 2 if a discharge control circuit is incorporated in the AC/DC converter 4 to prevent overcurrent or overvoltage.

As compared to the aforementioned battery pack 100 of the related art example, there is no need to provide any circuit in the plate main body 2 to prevent overdischarge or overcharge of the battery cell, thus permitting simplification of the circuitry and keeping down costs.

A description will be made next about the configuration of each of the process sections in the digital still camera 40 for the authentication process between the camera and the power supply plate 1. The digital still camera 40 in which the plate main body 2 is installed has positive, negative and information transfer terminal connection sections 51, 52 and 53 formed at the deepest position of the housing recessed portion 44 in the battery housing section 41 as described above. The same sections 51, 52 and 53 are adapted to be electrically connected respectively to the positive, negative and information transfer terminal sections 31, 32 and 33 formed on the terminal plate 20 of the plate main body 2.

When the plate main body is installed in the battery housing section 41, the digital still camera 40 is supplied with power from the positive and negative terminal connection sections 51 and 52. In addition, power supply plate identification information is fed to the same camera 40 from the information transfer terminal connection section 53.

The digital still camera 40 further includes a power control section 54 adapted to be supplied with power from the positive and negative terminal connection sections 51 and 52 so as to control power supply to a main camera process section 56 which will be described later. The digital still camera 40 still further includes an authentication process section 55 adapted to handle the authentication process which will be described later based on power supply plate identification information fed to the information transfer terminal connection section 53. The digital still camera 40 still further includes the main camera process section 56 adapted to handle the main operations of the digital still cameral 40.

When the plate main body 2 of the power supply plate 1 is installed in the battery housing section 41, the power control section 54 is supplied with power from the plate main body 2, thus activating the authentication process section 55. The power control section 54 controls whether to supply power to the main camera process section 56.

When activated by the power control section 54, the authentication process section 55 proceeds with the authentication process based on power supply plate identification information fed to the information transfer terminal connection section 53. The authentication process section 55 supplies the authentication result to the power control section 54. The authentication process section 55 is accessibly connected to a memory 55a which stores identification information of electronic equipment. Here, identification information of electronic equipment refers to information recorded in advance to the memory 55a, for example, at the time of shipment. This information is checked against identification information of the authentic power supply plate in the authentication process which will be described later.

The main camera process section 56 includes a plurality of process sections adapted to handle the main operations of the digital still camera 40. More specifically, the same section 56 includes image capture means adapted to capture an image of a subject, image processing means adapted to convert a captured image into image data, storage means adapted to store the image data, display means adapted to display the image data and user interface means adapted to be used by the user to issue instructions to the process means.

A description will be made next about the individual process steps of the authentication process which is conducted primarily by the power control section 54 and the authentication process section 55 with reference to FIG. 16.

As a precondition of the authentication process described below, we assume that the plate main body 2 of the power supply plate 1 is installed in the battery housing section 41 of the digital still camera 40. We further assume that the positive, negative and information transfer terminal sections 31, 32 and 33 are electrically connected respectively to the positive, negative and information transfer terminal connection sections 51, 52 and 53 formed on the battery housing section 41.

The power control section 54 is activated when supplied with power from the power supply plate 1. Then, the same section 54 supplies power to the authentication process section 55, activating the same section 55 and starting the authentication process detailed below.

It should be noted that the power control section 54 and the authentication process section 55 are implemented with a processor provided in the digital still camera 40. The authentication process is carried out as this processor runs a program based on the flowchart given below.

In step S11, the authentication process section 55 detects whether identification information of the power supply plate has been supplied from the information transfer terminal connection section 53. More specifically, the same section 55 determines within a predetermined period of time after its activation whether identification information of the power supply plate has been supplied. If so, the same section 55 proceeds to step S12. If not, the same section 55 proceeds to step S14.

In step S12, the authentication process section 55 performs the following authentication process based on the supplied identification information of the power supply plate. That is, the same section 55 reads identification information of electronic equipment from the memory 55*a*. Then, the same section 55 checks this information against the identification information of the power supply plate and proceeds to step S13.

In step S13, the authentication process section 55 determines, based on the result of comparison between the identification information of the electronic equipment and that of the power supply plate, whether the authentication is successful. When the authentication is successful, the same section 55 proceeds to step S15. If the authentication is unsuccessful, the same section 55 proceeds to step S14.

In step S14, the authentication process section 55 supplies, to the power control section 54, the authentication result indicating that the authentication was unsuccessful. The power control section 54 presents the authentication result to the user, for example, by displaying the result on the display means of the main camera process section 56. Then, the power control section 54 shuts off power supply to the main camera process section 56.

It should be noted that the above process steps are performed assuming that the plate main body 2 of the power supply plate 1 is installed in the battery housing section 41. The same authentication process is performed when a battery is installed in the battery housing section 41. That is, the authentication process section 55 checks the identification information of the electronic equipment against that of the battery. When the authentication is successful, the same section 55 proceeds to step S15. If the authentication is unsuccessful, the same section 55 proceeds to step S14.

In step S15, the authentication process section 55 determines, based on the identification information of the electronic equipment and that of the battery, whether the plate main body 2 is installed in the battery housing section 41. If so, the same section 55 proceeds to step S17. If not, the same section 55 proceeds to step S16. That is, in the present process, the authentication process section 55 proceeds to step S17 when the plate main body is installed in the battery housing section 41 of the digital still camera 40. The same section 55 proceeds to step S16 when the battery is installed therein.

In step S16, the authentication process section 55 supplies, to the power control section 54, the authentication information indicating that the battery is installed in the battery housing section 41. In response to this authentication information indicating that the battery is installed, the power control section 54 supplies power to the main camera process section 56 according to a battery mode detailed below.

Figure 17A:
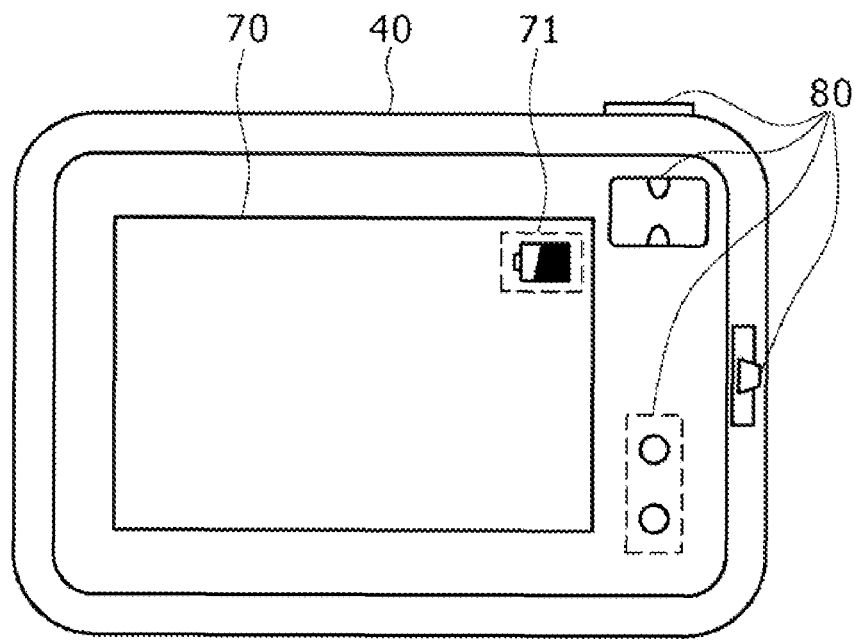
FIG. 17A is a view describing the operation of a main camera process section in battery mode.

In the present embodiment, the battery mode is an operational mode suited to drive the digital still camera 40 with the battery. More specifically, the process means of the main camera process section 56 operate as follows according to the battery mode. As illustrated in FIG. 17A, the digital still camera 40 includes a display 70 as display means and a plurality of operation input sections 80 on the enclosure thereof as user interface means among the main camera process section 56. Operations according to the battery mode will be described below with reference to this figure.

As a first operation, the power control section 54 enables, according to the battery mode, the auto power-off function adapted to stop driving the camera if there is no user input within a predetermined standby time from any of the operation input sections. Here, we assume that process means of this auto power-off function are built into the power control section 54 in the present embodiment as stop control means according to an embodiment.

As a second operation, the power control section 54 displays, according to the battery mode, remaining battery power information, for example, on an upper right corner portion 71 of the display 70. Here, remaining battery power information refers to information from the information terminal provided on the battery. This information is fed via the information transfer terminal connection section 53 formed on the battery housing section 41 and displayed by the main camera process section 56.

As a third operation, the power control section 54 sets the display output of the display 70 to a power saving mode. In the present embodiment, the power saving mode is an operational mode adapted to hold down power consumption so as to ensure a long period of operation of the digital still camera 40. More specifically, the display 70 outputs an image with low illumination, namely, at reduced chroma and lightness levels according to the power saving mode. Further, the display 70 does so if there is no input within a predetermined standby time from any of the operation input sections 80.

In step S17, the authentication process section 55 determines, based on identification information of the power supply plate, whether the plate main body 2 of the power supply plate 1, installed in the battery housing section 41, is an extended type of power supply plate, which will be described later. If not, that is, if the power supply plate is an ordinary type of power supply plate, the same section 55 proceeds to step S18. If so, that is, the power supply plate is an extended type of power supply plate, the same section 55 proceeds to step S19.

In step S18, the authentication process section 55 supplies, to the power control section 54, the authentication information indicating that the plate main body of an ordinary power plate is installed in the battery housing section 41. In response to the supplied authentication information, the power control section 54 starts power supply to the main camera process section 56 according to a power supply plate mode described below and terminates the authentication process based on identification information of the power supply plate.

Figure 17B:
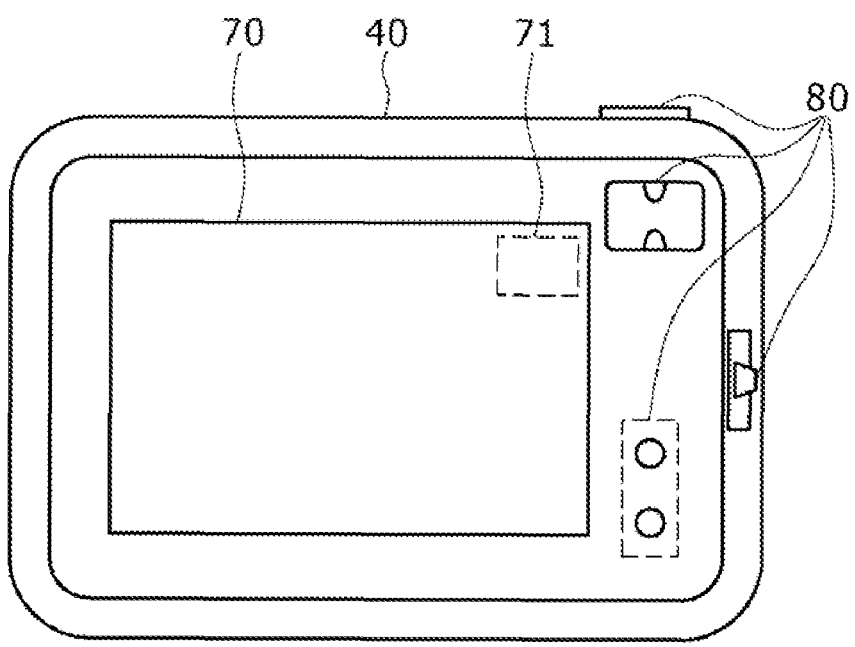
FIG. 17B is a view describing the operation of the main camera process section in power supply plate mode.

In the present embodiment, the power supply plate mode is an operational mode adapted to consume power without concern for remaining battery power in driving the digital still camera 40. More specifically, the process means of the main camera process section 56 operate as follows according to the power supply plate mode. It is to be noted that the digital still camera 40 includes the display 70 as display means and the plurality of operation input sections 80 on the enclosure thereof as illustrated in FIG. 17B. Operations according to the power supply plate mode will be described below with reference to this figure.

As a first operation, the power control section 54 disables the auto power-off function according to the power supply plate mode.

As a second operation, the power control section 54 does not display, according to the power supply plate mode, remaining battery power information which is displayed in the battery mode.

As a third operation, the power control section 54 sets the display 70 to a high illumination mode, for example, according to the power supply plate mode. Here, the high illumination display mode is an operational mode adapted to display an image on the display 70 without holding down power consumption. That is, the display 70 outputs, according to the high illumination display mode, an image at higher chroma and lightness levels than in the battery mode. Further, the display 70 maintains chroma and lightness levels high at all times even if there is no input from any of the operation input sections 80. In the high illumination display mode, the display 70 can provide an easier-to-see and more aesthetic image to users and customers than with low illumination in the battery mode, for example, when the digital still camera 40 is put on display in a store.

In step S19, the authentication process section 55 supplies, to the power control section 54, the authentication information indicating that the plate main body of an extended type of power plate is installed in the battery housing section 41. In response to the supplied authentication information, the power control section 54 starts power supply to the main camera process section 56 according to an extended power supply plate mode described below and terminates the authentication process based on identification information of the power supply plate.

In the present embodiment, the extended power supply plate mode is an operational mode adapted to operate the digital still camera 40 according to not only identification information of the power supply plate but also extended function information fed to the information transfer terminal connection section 53. The power control section 54 operates the main camera process section 56 according to the extended power supply plate mode. More specifically, the power control section 54 does so by enabling the following extended functions.

As a first function, the power control section 54 rewrites firmware of the main camera process section 56 in response to extended function information to upgrade the firmware functions.

As a second function, the power control section 54 enables, in response to extended function information, high power consumption image capture functions which are not enabled during normal operation including operation in the battery mode due to extremely high power consumption. The power control section 54 does so to control the image capture means of the main camera process section 56. Among high power consumption image capture functions are fast charging of the strobe, a continuous flash lighting function using the strobe, a low illumination photography function, a long-period timer image capture function and a long-period strobe exposure function. The low illumination photography function provides increased photoreceptive sensitivity to the solid-state image pickup device by applying a higher voltage thereto, thus allowing for image capture at low illumination. The long-period timer image capture function permits capture of a moving image for long hours.

The extended type of power plate supplies extended function information to the digital still camera 40 in addition to identification information of the power supply plate. This allows the digital still camera 40 to enable the high power consuming image capture functions which are normally disabled due to their extremely high power consumption when driven by the battery, thus permitting image capture using these functions.

As described above, the present embodiment determines which of the battery and the plate main body 2 of the power supply plate 1 is installed in the battery housing section 41 based on power supply plate identification information from the power supply plate 1 whose plate main body 2 is installed in the battery housing section 41 of the digital still camera 40. According to this determination result, power supply is controlled, thus ensuring high accuracy in authenticity verification of the battery and the power supply plate connected to the digital still camera 40 or other electronic equipment.

In the prior art, on the other hand, a discrimination groove is provided on the enclosure of each of the battery and the power supply plate to identify itself from the other. Alternatively, switches are provided which are adapted to be pressed respectively when the battery and the power supply plate are installed. In contrast, the present embodiment determines which of the battery and the plate main body 2 of the power supply plate 1 is installed in the battery housing section 41 based on identification information of the battery and that of the power supply plate. This alleviates restrictions on the shapes of the battery, the plate main body 2 of the power supply plate 1 and the battery housing section 41. Thus, the present embodiment provides higher power capacity of the battery by increasing the battery size. The present embodiment also provides an increased number of battery types which can be discriminated.

Further, the power supply plate 1 according to the present embodiment may be in any shape so long as it has the information output section 60 adapted to output identification information of the power supply plate to the digital still camera 40. However, the following advantages can be provided if the power supply plate 1 has the plurality of lead-out paths 16 adapted to change the direction in which to lead out the cable 3 of the power supply plate 1 according to the position of the lead-out hole formed on the digital still camera 40.

The lead-out section having the lead-out paths provides the power supply plate according to an embodiment with more options as to the direction in which to lead out the cable 3. This permits sharing of the power supply plate between a plurality of pieces of electronic equipment having a cable lead-out hole at different positions from each other on the battery housing section. However, even if such a power supply plate may be shared between a plurality of pieces of electronic equipment having a cable lead-out hole at different positions, it is impossible to use the power supply plate for a larger number of models unless the shape of the housing section is standardized among different models.

Here, the power supply plate according to the present embodiment allows electronic equipment to perform the authentication process according to the identification information of the power plate. Therefore, the power supply plate permits power supply without impairing safety even if the shape of the housing section is standardized among different models so that electronic equipment can perform the authentication process according to the identification information of the power plate.

That is, the power supply plate according to the present embodiment has the information output section adapted to output identification information of the power supply plate and the plurality of lead-out paths adapted to change the direction in which to lead out the cable. This ensures high accuracy in authenticity verification and allows power supply to a greater number of electronic equipment models.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power supply system comprising:
   electronic equipment adapted to control power supply based on battery identification information from a battery installed in a battery housing section; and
   a power supply plate, the power supply plate including
   a plate main body installed in the battery housing section of the electronic equipment, and
   a cable, a first end of which is connected to the plate main body and a second end of which is led through a lead-out hole of the battery housing section out of the electronic equipment, the second end also having a connector formed thereon which is connected to a power source, wherein
   power is supplied from the power source connected to the connector of the power supply plate to the electronic equipment, wherein
   the plate main body of the power supply plate has an information output section adapted to read identification information of the power supply plate from a storage medium and output the information to the electronic equipment in which the plate main body is installed, wherein
   the electronic equipment has an authentication process section and a control section, wherein
   the authentication process section is adapted to determine, based on power supply plate identification information from the information output section of the plate main body and battery identification information from the battery, which of the battery and the plate main body is installed in the battery housing section, and wherein
   the control section is adapted to control power supply from either the battery or the power supply plate according to the authentication result of the authentication process section.

2. The power supply system according to claim 1, wherein
   the electronic equipment has a display section adapted to display an image, and wherein
   if the authentication process section determines that the plate main body is installed in the battery housing section, a control section of the electronic equipment sets at least lightness or chroma of the display output of the display section to a higher level than when the battery is installed therein to display an image.

3. The power supply system according to claim 1, wherein
   the electronic equipment has a display section capable of displaying remaining battery power information, and wherein
   if the authentication process section determines that the plate main body is installed in the battery housing section, the control section of the electronic equipment does not display the remaining battery power information on the display section.

4. The power supply system according to claim 1, wherein
   the electronic equipment has stop control means adapted to stop driving the electronic equipment if there is no operation input thereto within a predetermined standby time, wherein
   if the authentication process section determines that the battery is installed in the battery housing section, the control section of the electronic equipment enables the operation of the stop control means, and wherein
   if the authentication process section determines that the plate main body is installed in the battery housing section, the control section of the electronic equipment disables the operation of the stop control means.

5. The power supply system according to claim 1, wherein
   the plate main body has a holding section adapted to hold the one end of the cable and a plurality of lead-out paths formed in the outer peripheral direction of the plate main body from the holding section, the lead-out paths adapted to change the direction in which to lead out the cable according to the position of the lead-out hole formed on the electronic equipment.

6. A power supply plate comprising:
   a plate main body installed in a battery housing section of electronic equipment adapted to control power supply based on battery identification information from a battery installed in the battery housing section; and
   a cable, a first end of which is connected to the plate main body and a second end of which is led through a lead-out hole of the battery housing section out of the electronic equipment, the second end also having a connector formed thereon which is connected to a power source, wherein
   power is supplied from the power source connected to the connector to the electronic equipment, wherein
   the plate main body has an information output section adapted to read identification information of the power supply plate from a storage medium and output the information to the electronic equipment in which the plate main body is installed, the information output section also adapted to cause the electronic equipment to control power supply based on the output identification information of the power supply plate.

7. Electronic equipment for controlling power supply based on battery identification information from a battery installed in a battery housing section, the electronic equipment comprising:
   an authentication process section adapted to determine which of the battery and a plate main body is installed in the battery housing section based on power supply plate identification information from the power supply plate having the plate main body installed in the battery housing section of the electronic equipment which is connected, via a cable, to a connector connected to a power source and battery identification information from the battery; and
   a control section adapted to control power supply from either the battery or the power supply plate according to the authentication result of the authentication process section.

* * * * *